(12) United States Patent
Grundhoefer et al.

(10) Patent No.: US 11,710,310 B2
(45) Date of Patent: Jul. 25, 2023

(54) VIRTUAL CONTENT POSITIONED BASED ON DETECTED OBJECT

(71) Applicant: Apple Inc., Cupertino, CA (US)

(72) Inventors: Anselm Grundhoefer, Saratoga, CA (US); Rahul Nair, Daly City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/881,691

(22) Filed: May 22, 2020

(65) Prior Publication Data

US 2020/0401804 A1 Dec. 24, 2020

Related U.S. Application Data

(60) Provisional application No. 62/863,359, filed on Jun. 19, 2019.

(51) Int. Cl.
*G06V 20/20* (2022.01)
*G06T 7/579* (2017.01)
*G06F 3/01* (2006.01)
*G02B 27/01* (2006.01)
*G06V 40/20* (2022.01)
*G06V 40/10* (2022.01)

(52) U.S. Cl.
CPC ......... *G06V 20/20* (2022.01); *G02B 27/0172* (2013.01); *G06F 3/017* (2013.01); *G06T 7/579* (2017.01); *G06V 40/107* (2022.01); *G06V 40/28* (2022.01)

(58) Field of Classification Search
None
See application file for complete search history.

(56) References Cited

U.S. PATENT DOCUMENTS

| | | | |
|---|---|---|---|
| 6,771,294 B1 | 8/2004 | Pulli et al. | |
| 8,558,872 B1 * | 10/2013 | Cho | G06T 11/20 348/43 |
| 9,310,891 B2 * | 4/2016 | Rafii | G02B 27/017 |
| 9,484,005 B2 | 11/2016 | Rezaiifar et al. | |
| 9,569,001 B2 | 2/2017 | Mistry et al. | |
| 10,209,513 B2 * | 2/2019 | Woo | H04N 23/631 |
| 10,878,819 B1 * | 12/2020 | Chavez | G10L 15/25 |
| 11,158,128 B2 * | 10/2021 | Chojnacka | G06T 7/73 |
| 2008/0284864 A1 * | 11/2008 | Kotake | G06V 10/245 348/222.1 |
| 2015/0248170 A1 | 9/2015 | Abovitz et al. | |
| 2016/0239080 A1 * | 8/2016 | Margolina | G06F 1/163 |
| 2019/0121522 A1 * | 4/2019 | Davis | G06V 40/28 |

(Continued)

OTHER PUBLICATIONS

"Introducing Word Lens", Youtube.com; pp. 1-10; Dec. 16, 2010.

(Continued)

*Primary Examiner* — Hilina K Demeter
(74) *Attorney, Agent, or Firm* — Thompson Hine LLP

(57) ABSTRACT

Various implementations disclosed herein include devices, systems, and methods that use an object as a background for virtual content. Some implementations involve obtaining an image of a physical environment. A location of a surface of an object is detected based on the image. A virtual content location to display virtual content is determined, where the virtual content location corresponds to the location of the surface of the object. Then, a view of the physical environment and virtual content displayed at the virtual content location is provided.

20 Claims, 5 Drawing Sheets

(56) References Cited

U.S. PATENT DOCUMENTS

2020/0410753 A1* 12/2020 Molyneaux ........... G06T 19/006
2021/0181854 A1*  6/2021 Nakagawa ........... G06V 40/107

OTHER PUBLICATIONS

Chatzopoulos, Dimitris; Bermejo, Carlos; Huang, Zhanpend, Butabayeva, Arailyn, Zheng, Rui, Golkarifard, Morteza and Hui, Pan; "Hyperion: A Wearable Augmented Reality System for Text Extraction and Manipulation in the Air", MMSys 2017, Taipei, Taiwan; pp. 1-27.

Ezaki, Nobuo, Bulacu, Marius and Schomaker, Lambert; "Text Detection from Natural Scene Images: Towards a System for Visually Imparied Persons"; https://ieeexplore.ieee.org/document/1334351; pp. 1-4, 2004.

Palladino, Tommy; "This Android App Lets You Search for Specific Words in Books & Documents via Augmented Reality", Sep. 14, 2018; 1 page.

Teaching Smartphones how to read: OCR for the Wikitude SDK; https://www.wikitude.com/showcase/text-recognition-sdk/; Jan. 25, 2019, pp. 1-2.

Tatwany, Lamma; Quertani, Henda Chorfi; "A review on using augmented reality in text translation", 2017 6th International Conference on Information and Communication Technology Accessibility(ICTA), 1 page.

\* cited by examiner

VIRTUAL CONTENT POSITIONED BASED ON DETECTED OBJECT

CROSS-REFERENCE TO RELATED APPLICATIONS

This application claims the benefit of U.S. Provisional Application Ser. No. 62/863,359 filed Jun. 19, 2019, which is incorporated herein in its entirety.

TECHNICAL FIELD

The present disclosure generally relates to electronic devices, and in particular, to systems, methods, and devices for displaying virtual content.

BACKGROUND

Text, images, and other virtual augmentations included in virtual content may be difficult to see or understand. For example, the virtual content may partially or entirely blend with the surrounding physical environment with which it is displayed. In the case of an optical see-through display, the limited dynamic range of the transparent display, the illumination conditions (e.g., bright sun light) in the physical environment, or spatial frequencies (e.g., luminance or chrominance) of an observed physical environment may make seeing or understanding the virtual content difficult. For example, virtual content may be difficult to see or understand in circumstances in which the physical environment is brightly lit or contains varying colors, depths, or high frequency contrast edges.

SUMMARY

Various implementations disclosed herein include devices, systems, and methods for providing computer generated reality (CGR) content that includes virtual content that is displayed based on a surface of a specifically detected object such as the user's hand. In various implementations in an optical see-through head mounted device (HMD), the background for virtual content (e.g., text) is the physical environment seen directly through the see-through portion of the HMD. The HMD may have little if any control over the appearance of the physical environment as seen through the see-through portion of the HMD. Moreover, the virtual content may be viewed by the user as a combination of the background physical environment, the ambient light source (e.g., reddish sunlight), and the actual color of the virtual content. In some implementations, the virtual content is provided as an overlay by adding light at the see-through display in addition to light provided by the physical environment. The virtual content is seen (e.g., by the user) in combination with the physical environment. The visibility of the virtual content is improved in these and other circumstances by selectively displaying the virtual content in positions relative to surfaces having characteristics that may make the virtual content easier to see or understand. For example, displaying the virtual content over the relatively consistent and flat surface of the user's hand may make a virtual object easier to see than displaying the virtual content in front of a tree of variable color and moving leaves.

Various implementations disclosed herein include devices, systems, and methods that use the user's hand as a detectable and relatively well-defined background that is able to render augmentations (e.g., virtual content) in CGR environments. In some implementations, using the hand (e.g., palm, fist, back of the hand, or surface thereof) as a background has advantages. The hand may have a consistent shape, color, brightness, or position, assuming the user holds his or her hand relatively still. Moreover, the rendered virtual content may be displayed (e.g., visually optimized) based on the user's hand reflectance (e.g., its color) with respect to a current illumination condition (e.g., which can be sensed by sensors such as an ambient light sensor or any other camera sensor) at the HMD.

Some implementations detect and track the hand's position with respect the HMD using a sensor located at or in communication with the HMD. In various implementations, detection and tracking is performed using a simultaneous localization and mapping (SLAM)-based technique or an RGB-D-based technique. In various implementations, detecting and tracking the hand's position involves correlating a hand color or a hand model to a depth map or the like to detect and track the hand shape, and pose (e.g., orientation, and position) with respect to the HMD.

In some implementations, after detecting the hand, the augmentations (e.g., virtual content overlay) are positioned relative to a hand surface (e.g., a plane in front of the hand surface or a plane fitted to the hand surface). In some implementations, the appearance of the virtual content is modified or corrected (e.g., for visibility or contrast) according to the color of the hand as well as the lighting conditions. Generally, the virtual content may be more visible or understandable to the HMD user with the hand as a background because the skin of the hand may contain few high-frequency textural variations.

In some implementations, the virtual content can be easily enlarged by applying a scale that is fixed to the detected hand size, e.g., the virtual content can be directly enlarged by moving the hand closer to the HMD, and the virtual content can be reduced in size by moving the hand further away from the HMD.

Although the implementations described herein primarily refer to the user's hand as an detectable background or a relatively well-defined background that is able to render augmentations (e.g., virtual content) in optical see-through CGR environments, this application is not intended to be so limited as any detected user body part or an object (e.g., book, wallet, etc.) held by a user hand or other body part may be used.

In some implementations, at an electronic device having a processor and a sensor implements, a method includes obtaining an image of a physical environment. A location of a surface of an object is detected based on the image, where the object is a portion of a body (e.g., hand) of a user or the object is held by the portion of the body of the user. A virtual content location to display virtual content is determined. The virtual content location corresponds to the location of the surface of the object. Then, a view of the physical environment and the virtual content positioned at the virtual content location is provided.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
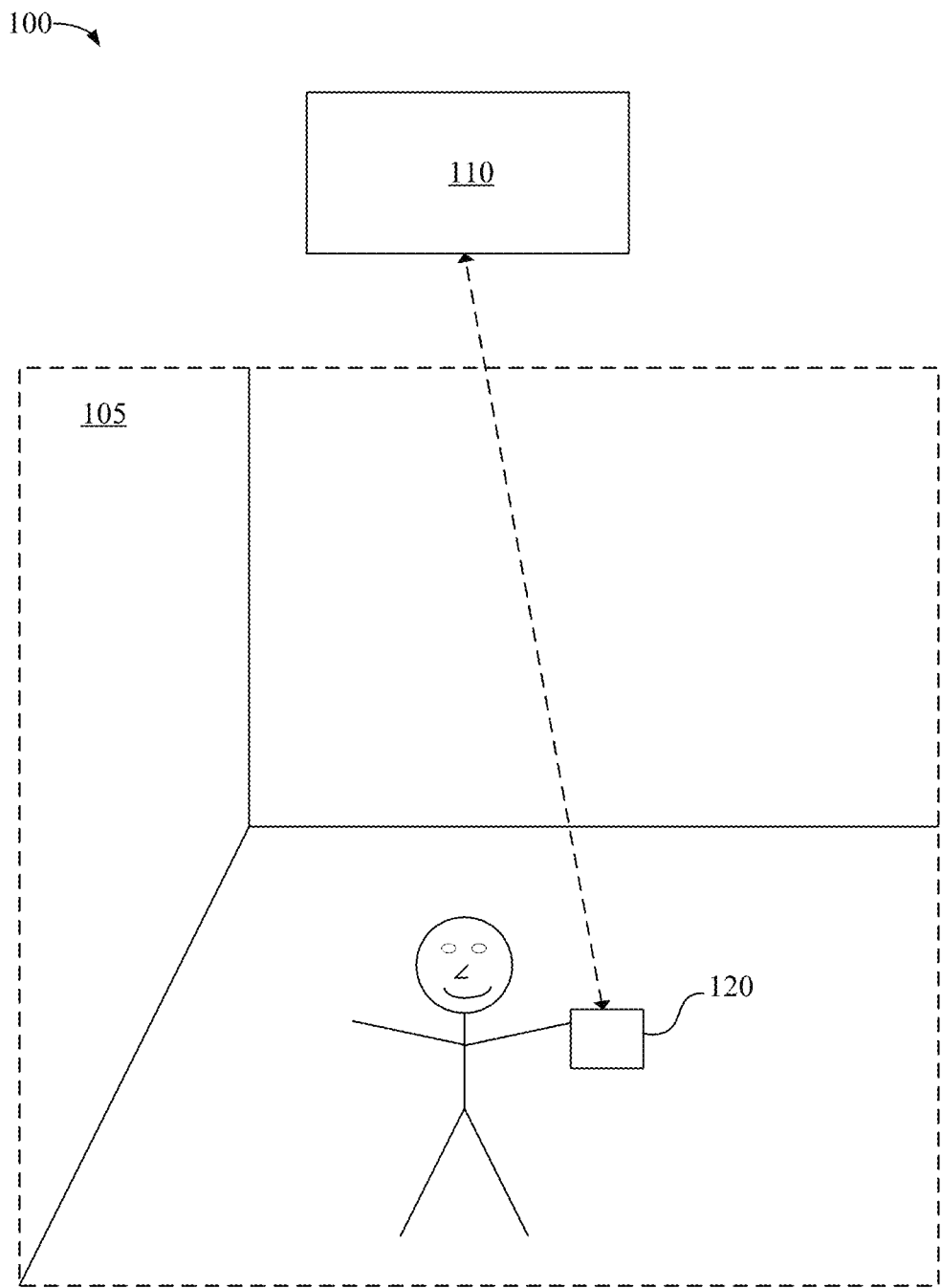
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Figure 2:
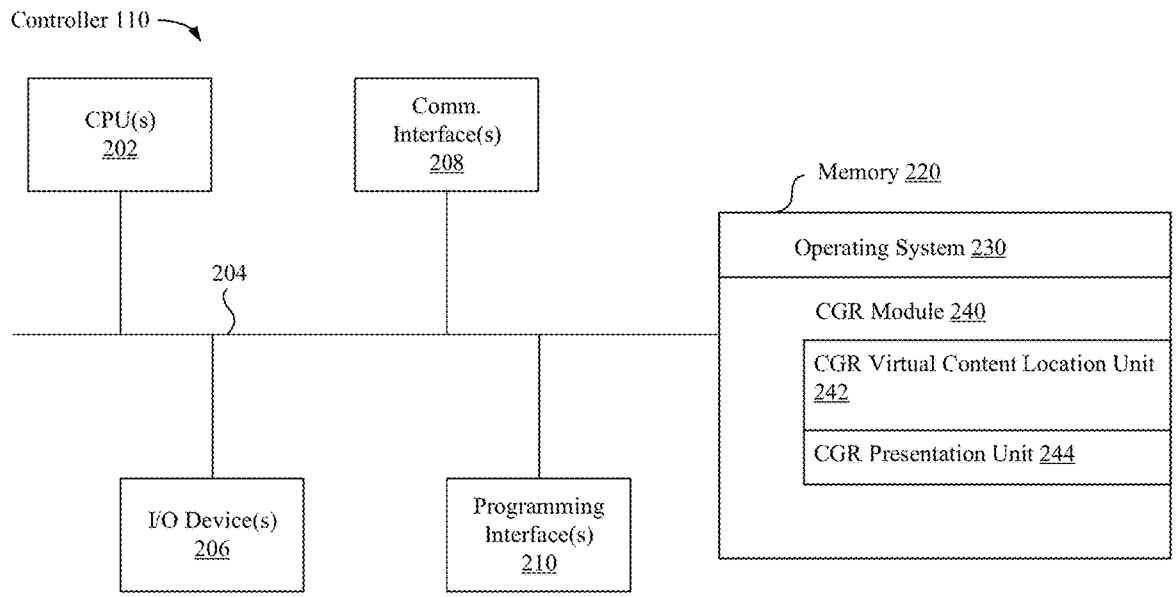
FIG. 2 is a block diagram of an example controller in accordance with some implementations.
Figure 3:
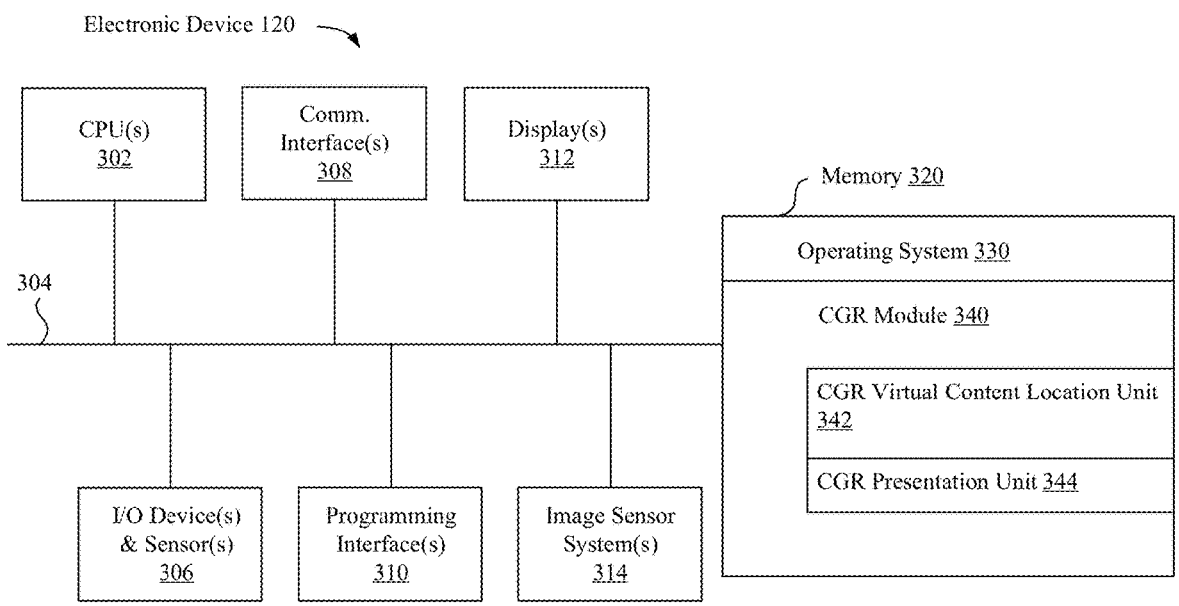
FIG. 3 is a block diagram of an example electronic device in accordance with some implementations.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein. While FIGS. 1-3 depict exemplary implementations involving a handheld electronic device, other implementations do not necessarily involve a handheld electronic device and may involve other types of devices including, but not limited to, watches and other wearable electronic devices, mobile devices, laptops, desktops, gaming devices, home automation devices, head mounted devices (HMD), devices with opaque or additive displays, and other devices that include or use image capture devices.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical environment. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In some implementations, the controller 110 is configured to manage and coordinate a computer-generated reality (CGR) environment for the user. In some implementations, the controller 110 includes a suitable combination of software, firmware, or hardware. The controller 110 is described in greater detail below with respect to FIG. 2. In some implementations, the controller 110 is a computing device that is local or remote relative to a physical environment 105.

In one example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the controller 110 and the electronic device 120 are configured to present the CGR environment to the user together.

In some implementations, the electronic device 120 is configured to present the CGR environment to the user. In some implementations, the electronic device 120 includes a suitable combination of software, firmware, or hardware. The electronic device 120 is described in greater detail below with respect to FIG. 3. In some implementations, the functionalities of the controller 110 are provided by or combined with the electronic device 120, for example, in the case of an electronic device that functions as a stand-alone unit.

According to some implementations, the electronic device 120 presents a CGR environment to the user while the user is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image capture devices or other sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and computer-generated reality (CGR) module 240.

The operating system 230 includes procedures for handling various basic system services and for performing hardware dependent tasks.

In some implementations, the CGR module 240 is configured to create, edit, present, or experience CGR environments. In some implementations, the CGR module 240 includes a CGR virtual content location unit 242 and a CGR presentation unit 244. The CGR virtual content location unit 242 is configured to determine a virtual content location to place virtual content based on a detected body part or object held by a body part. The CGR presentation unit 244 is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc.

Although these modules and units are shown as residing on a single device (e.g., the controller 110), it should be understood that in other implementations, any combination of these modules and units may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present a CGR environment to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more interior or exterior facing sensor systems 314 include an image capture device or array that captures image data or an audio capture device or array (e.g., microphone) that captures audio data. The one or more image sensor systems 314 may include one or more RGB cameras (e.g., with a complimentary metal-oxide-semiconductor (CMOS) image sensor or a charge-coupled device (CCD) image sensor), monochrome cameras, IR cameras, event-based cameras, or the like. In various implementations, the one or more image sensor systems 314 further include an illumination source that emits light such as a flash. In some implementations, the one or more image sensor systems 314 further include an on-camera image signal processor (ISP) configured to execute a plurality of processing operations on the image data.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR module 340.

The operating system 330 includes procedures for handling various basic system services and for performing hardware dependent tasks.

In some implementations, the CGR module 340 is configured to create, edit, present, or experience CGR environments. In some implementations, the CGR module 340 includes a CGR virtual content location unit 342 and a CGR presentation unit 344. The CGR virtual content location unit 342 is configured to determine a virtual content location to place virtual content based on a detected body part or object held by a body part. The CGR presentation unit 344 is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

In various implementations, the physical environment, which may not be controllable by the user or the HMD, is visible to the user. For example, for an optical see-through head mounted display, the underlying physical environment may make it difficult to see or understand virtual content added to the optical see-through HMD. As another example, even well-defined virtual text added to the CGR environment may be difficult to read or unreadable. The optical see-through head mounted display may not provide a uniform display condition or a controllable display condition for adding virtual content. Further, a preferential location to display the virtual content on the optical see-through head mounted display cannot be determined in advance (or maintained once selected) because the physical environment is independent of the CGR environment and also based on a changeable viewpoint of the HMD user.

Many physical environments provide backgrounds for CGR environments that include moving or dissimilar colored pixels. For example, the physical environments viewed while a user is looking out of the window of a moving bus or walking down a street present cluttered, rapidly changing backgrounds. Further, situations such as watching live sports (e.g., a baseball game) or playing sports (e.g., skiing on a sunny day) can present cluttered or changing backgrounds. Even in physical environments having uncluttered appearances, the movable gaze of the user still presents varying uncontrollable backgrounds for virtual content.

In various implementations, electronic devices determine a suitable background condition or location in the current physical environment to overlay virtual content in CGR environments. In some implementations, electronic devices such as HMDs, including systems, methods, and devices for optical see-through CGR environments, use a user's body part or an object held by the user's body part as background or location for displaying virtual content in a CGR environment.

In some implementations, the user's hand is a detectable background or relatively well-defined background that is able to render augmentations (e.g., virtual content) in optical see-through CGR environments for HMDs. In some implementations, using a hand (e.g., body part) of the HMD user (e.g., palm, fist, back of the hand, or surface thereof) has advantages including that the rendered virtual content can be displayed (e.g., visible or visually optimized) depending on the user's hand reflectance (e.g., its color) in the physical environment. In some implementations, using a hand has advantages including that the rendered virtual content can be displayed (e.g., visible or visually optimized) depending on the ambient or current illumination in the physical environment. In some implementations, using a hand has advantages including that the rendered virtual content can be displayed (e.g., visible or visually optimized) depending on a tint of a display of the optical see-through device. In some implementations, using an object held by a hand (e.g., body part) of the HMD user for the CGR environment has advantages including that the rendered virtual content can be accurately displayed (e.g., visible or visually optimized) depending on the object's reflectance (e.g., its color), a current ambient illumination condition, or a tint of the optical see-through device display in the physical environment. In some implementations, the held object is a book, cell phone, or the like. In some implementations, the held object has a consistent color across some or all of one or more of its surfaces upon which virtual content may be overlaid. In some implementations, the held object is a color that provides desirable visual contrast to the virtual content. In some implementations, the held object has characteristics that increase its visual detectability (e.g., shape or color).

In various implementations, the HMD detects or tracks the user's hand in the physical environment. In various implementations, the HMD detects or tracks a pose of the user's hand in the physical environment. In some implementations, the HMD includes a sensor (e.g., a camera) that obtains an image (e.g., a representation) of the physical environment. In some implementations, the HMD tracks the hand of the user in an image (e.g., see FIG. 5, block 520 described herein), and displays the virtual content at a virtual content location within an outline of the hand with respect to the viewpoint (e.g., eye(s)) of the HMD user. In some implementations, there is a buffer (e.g., a prescribed spatial distance) between the displayed virtual content and the outline of the user's hand. In some implementations, there is a visible border around the virtual content.

In some implementations, the HMD detects the hand of the user in an image, determines a position of the hand in the physical environment, and identifies a plane based on the hand. The plane may be selected based on the plane being substantially orthogonal to a gaze direction toward the hand. The virtual content is displayed at a virtual content location on the plane. In some implementations, the plane is a prescribed distance in front of hand, at a surface of the hand, or passes through a part of the hand. In some implementations, the plane is a prescribed distance in front of a part (e.g., the palm) of the hand, at a surface of the part of the hand, or passes through a portion of the part of the hand. In some implementations, the part of the hand of the surface of the object satisfies one or more predetermined criteria. For example, the part of the hand is at least a certain size, continuous, a color, or is a finger, etc. In some implementations, the plane continuous, deformable, curved, or includes a set of planes that each correspond to a part of the detected hand.

In some implementations, the virtual content is displayed using a color (e.g., text color) selected based on a color of the user's hand, ambient light, or a color (tint) of the wearable display. In some implementations, the visible displayed virtual content is seen by the user as a combined color (e.g., cumulative color) in the optical see-through CGR environment. In some implementations, the selected color of the virtual content renders the virtual content with sufficient contrast to the HMD user. In some implementations, the selected color of the virtual content accurately renders the virtual content (e.g., a brand X soda can is always red). In some implementations, the selected color of the virtual content increases its visibility or readability to the HMD user.

Figure 4A:
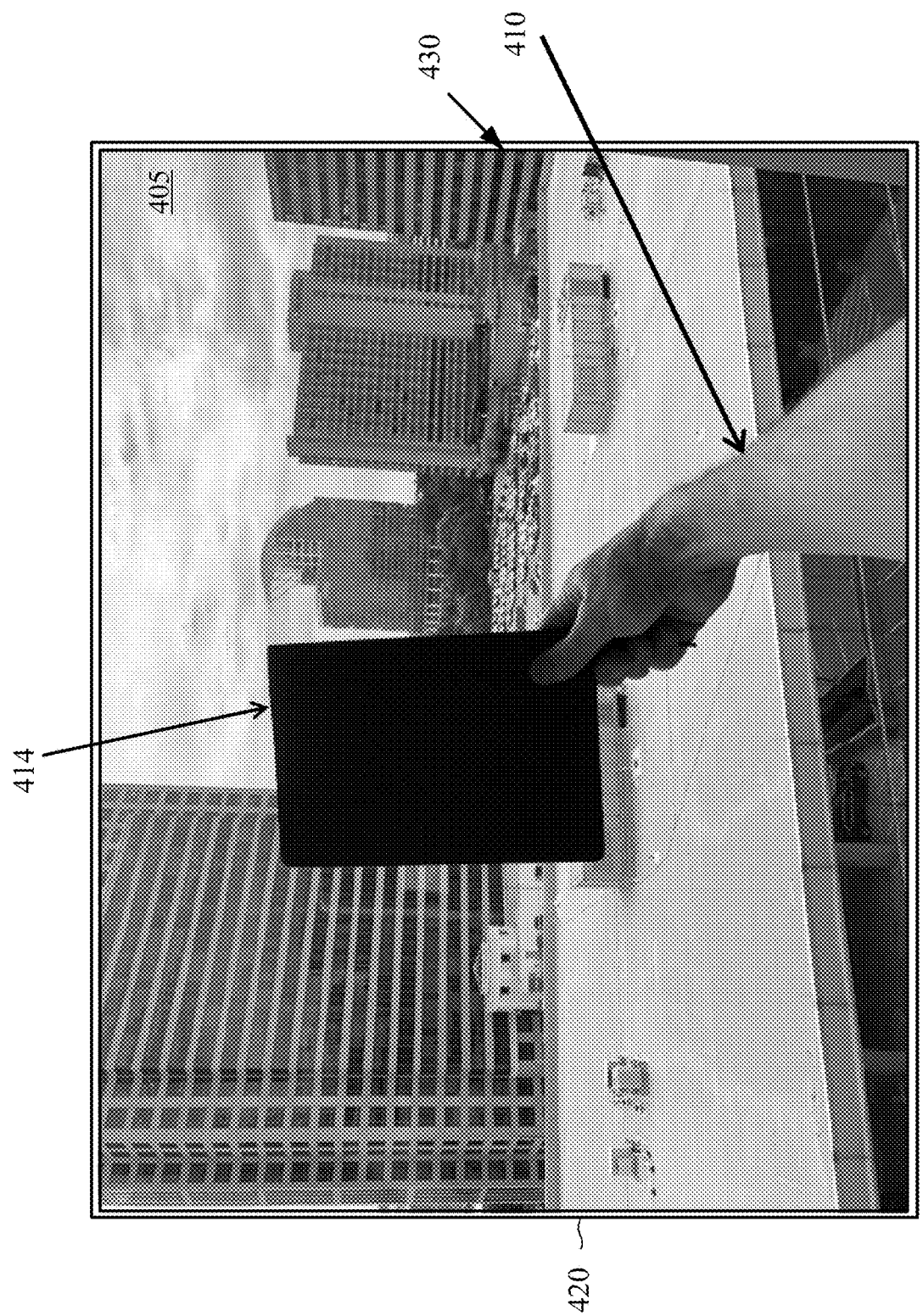
FIG. 4A is a block diagram illustrating a physical environment at a first time during which a device provides a CGR environment to a user according to some implementations.

FIG. 4A is a block diagram illustrating an electronic device providing a CGR environment 430 that depicts a physical environment 405 at a first time. In some implementations, the CGR environment 430 is presented to the user using an HMD as the electronic device 120. While in FIG. 4A the CGR environment 430 is discussed as being provided using an optical see-though display 420, in other implementations the CGR experience is not provided via an optical see-through display (e.g., the CGR environment may be provided as video pass through).

As shown in FIG. 4A, an object 414 and the user's arm 410 holding the object 414 are depicted in (and may be detected in) the physical environment 405. In some implementations, one or more outward facing additional sensors (e.g., image capture device or array (e.g., a camera(s)) capture image data that can be used to detect the object 414 and the arm 410 of the user holding the object 414 in the physical environment 405. In some implementations, the object 414 has characteristics that increase its visual detectability (e.g., shape or color).

Figure 4B:
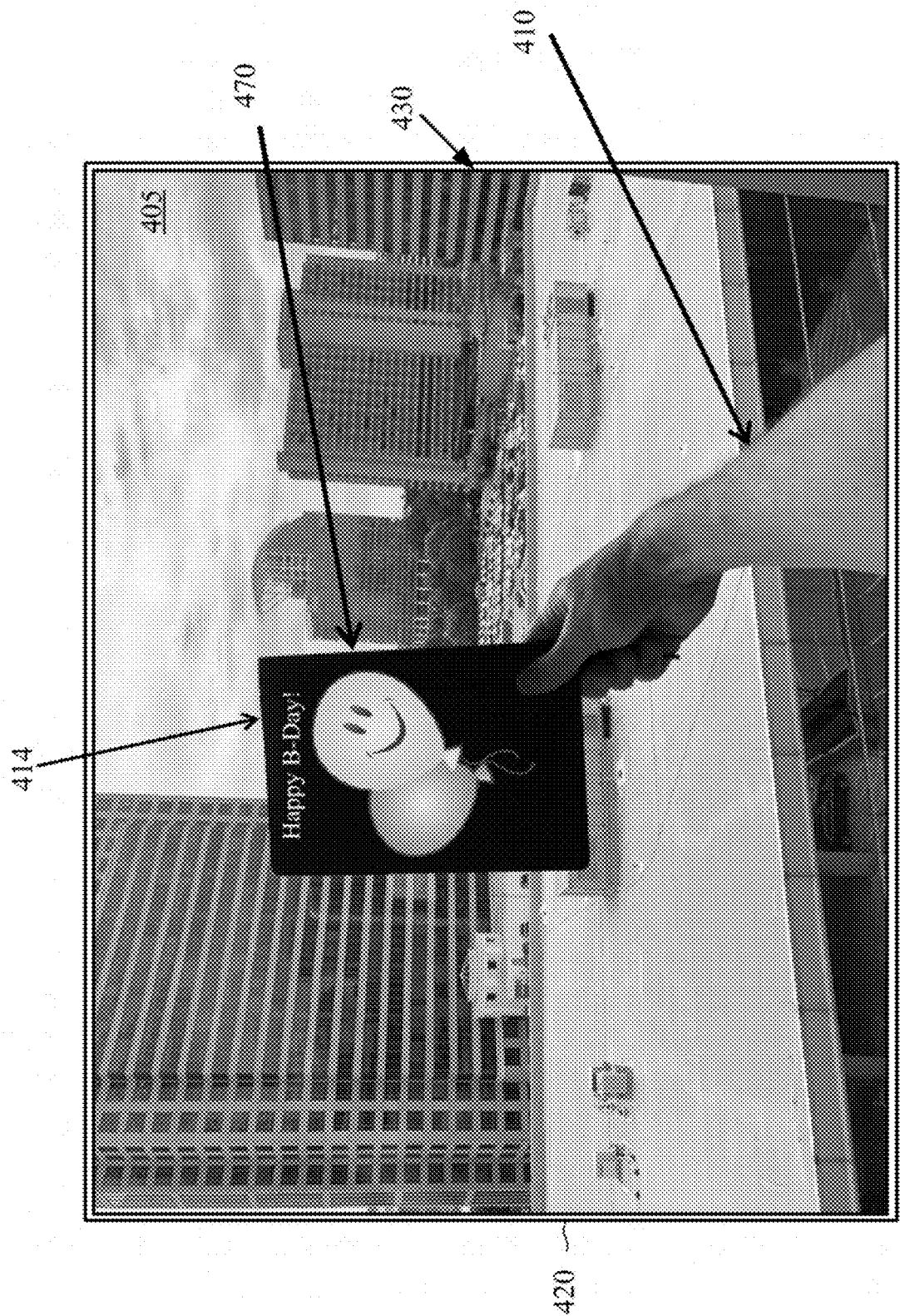
FIG. 4B is a block diagram illustrating the physical environment of FIG. 4A at a second time during which the device continues to provide the CGR environment to the user according to some implementations.

FIG. 4B is a block diagram illustrating the electronic device providing the CGR environment 430 at a second later time. As shown in FIG. 4B, virtual content 470 is displayed to the user in front of the object 414 in the CGR environment 430. In one example, the virtual content 470 may identify or provide information about something in the physical environment 405. In another example, the virtual content 470 may relate to something unrelated to the physical environment 405. In one example, upon receipt of virtual content 470 (e.g., a birthday icon), that virtual content 470 is displayed to the user in front of the object 414 in the CGR environment 430. In another example, upon receipt of a text message, the virtual content 470 may include text of a text message that is displayed to the user on a surface of the object 414 in the CGR environment 430. In some implementations, a boundary may optionally be provided around the virtual content 470.

Some implementations involve a set-up or initialization mode. In some implementations, the initialization mode sets up one or more criteria for displaying the virtual content in CGR environments. For example, in the initialization mode the skin color of the user can be detected and stored. Additional criteria such as, but not limited to, text size, preferred text color (e.g., when multiple color are identified), initiating voice command and terminating voice command (e.g., used to begin and end display of CGR virtual content with the HMD user's hand, ambient light detection, object identification, etc. In some implementations, font, font style, text effects, and other user customizations are included in the initialization mode. In some implementations, a virtual home screen provides access to the initialization mode for overlaying virtual content in CGR environments at the user's hand in a physical environment.

In some implementations, hand tracking functionality at the HMD further supports gesture recognition. In some implementations, hand gesture recognition using machine learning (ML) or other image-based recognition techniques is used. In various implementations, systems, methods, or devices using the user's hand as a suitable background or background location provide intuitive interactions with virtual content in CGR environments for HMDs.

In some implementations, hand gesture recognition provides a direct user interface with various CGR virtual content display operations. For example, it may be difficult (e.g., even with initialization or customization) to appropriately size overlaid virtual content in CGR environments for HMDs. Accordingly, in one implementation, a detected hand gesture of the hand moving closer to the HMD during display of virtual content increases a size of the virtual content (e.g., is recognized as the command to "zoom in" or increase display size of the virtual content). Similarly, a detected hand gesture of the hand moving away from to the HMD during display of virtual content decreases a size of the virtual content (e.g., is recognized as the command to "zoom out" or decrease display size of the virtual content).

In some implementations, hand gestures are used to initiate or terminate the functionality at the HMD of display of virtual content at the user's hand. For example, rotation of a closed first clockwise or counterclockwise turns on or off display of virtual content at the user's hand at the HMD. In another implementation, vertical movement or horizontal movement of the user's hand (e.g., vertical or horizontal head shakes) turns on or off display of virtual content at the user's hand at the HMD. In some implementations, sequential detection of the user's hand (or hand color) for a preset time interval motionless in the user's view toggles the display of virtual content at the user's hand "on" and then "off" at the HMD.

In some implementations, the physical environment (e.g., context) initiates or terminates displaying the CGR virtual content at the HMD user's hand. For example, there are situations where displaying the virtual content at the user's hand is turned off because the user's hand(s) are otherwise occupied (e.g., playing sports or driving a car). In some implementations, the user can control (e.g., allow or prevent) displaying of available virtual content at the HMD user's hand based on the physical environment (e.g., display advertising when shopping or museum/historical information when sightseeing). In some implementations, the user controls selection among available virtual content for display at the user's hand based on the physical environment. For example, only advertising directed to food or restaurants is allowed to be displayed at the user's hand when walking down the street.

In some implementations, individual CGR virtual content visible to the HMD user can be manipulated as desired. For example, selecting (e.g., encircling with the fingers) virtual content visible at the HMD, re-displays that selected virtual content at the HMD user's hand (e.g., far-away, small, or otherwise illegible virtual content). Alternatively, a hand gesture of "grabbing" visible virtual content with the left hand re-displays that virtual content at the user's right hand.

In some implementations, virtual content available to the HMD user may include viewing constraints (e.g., proprietary or content provider limitations) upon its use. For example, a movie poster is displayed at a theater and additional virtual content (e.g., character(s) actions related to the movie, advertisement, or teasers) is available and visible through the optical see-through HMD. In this situation, the content provider may not allow the selection or re-displaying of that virtual content outside (e.g., at the HMD user's hand) the movie poster (e.g., displayed with a different background, coloring, or image quality).

In some implementations, HMDs providing for optical see-through CGR environments use a transparent display for augmentations (e.g., virtual content) to the CGR environment. In some implementations, the transparent display includes a tint or a pale coloration. In some implementations, optical see-through HMDs are provided as wearable glasses with separate transparent lenses for each eye. In some implementations, optical see-through HMDs are provided as a single transparent display with separate overlaid virtual content for each eye to provide a stereoscopic CGR environment.

Although the implementations described herein primarily refer to the user's hand as an detectable and relatively well-defined background that is able to render augmentations (e.g., virtual content) in optical see-through CGR environments, this application is not intended to be so limited as any detected user body part or an object held by a user's hand or other body part may be used in various implementations described herein.

Figure 5:
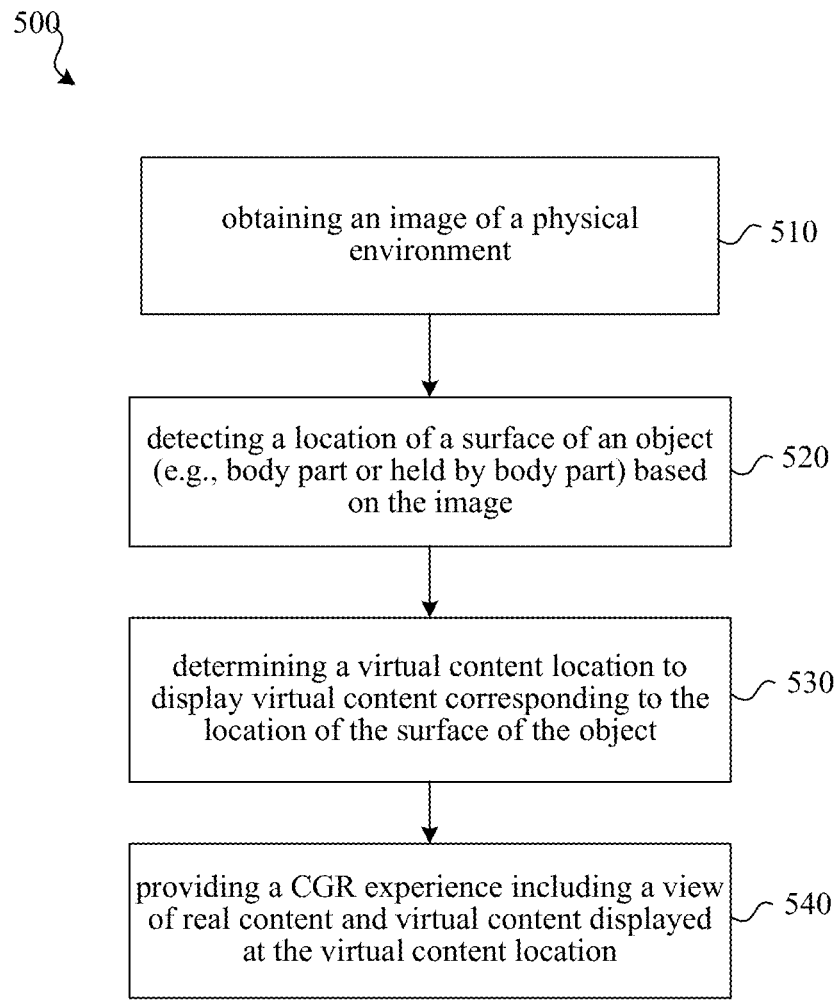
FIG. 5 is a flowchart illustrating an exemplary method of determining a suitable background condition or location in a physical environment to overlay virtual content in CGR environments according to some implementations.

FIG. 5 is a flowchart illustrating an exemplary method of determining a suitable background condition or background location in the current physical environment to overlay virtual content in CGR environments according to some implementations. In some implementations, the method 500 is performed by a device (e.g., controller 110 or electronic device 120 of FIGS. 1-3). The method 500 can be performed for optical see-through CGR environments using an HMD or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 510, the method 500 obtains an image of a physical environment. In some implementations, the image of the physical environment is obtained using a sensor (e.g., camera) on an HMD. In some implementations, the camera can be a RGB camera, a depth camera, a RGB-D camera, one or more 2D cameras, thermal cameras, or the like. In some implementations, the sensor is used to estimate a shape, orientation, and position or a hand (e.g., other body part, of object held by the body part) of an HMD user. In some implementations, the sensor is mounted on an electronic device that is an optical see-through head mounted display.

At block 520, the method 500 detects a location of an object (e.g., a surface of the object) based on the image. In some implementations, the object is a hand, a hand and part of an arm, a body part, or an object held by the body part of the HMD user. In some implementations, a location of the object includes a depth of the object (e.g., distance from the HMD). In some implementations, the surface of the object is a 3D area corresponding to the detected object. In some implementations, the surface of the object is a 2D area corresponding to the detected object. In some implementations, the surface of the object is used to determine a display plane (e.g., flat or deformable) that is located a prescribed distance in front of the object, passing through the object, or the like.

In some implementations at block 520, the object (e.g., the HMD user's hand) is detected or tracked. For example, a depth sensor may be used to construct and analyze a depth map to reconstruct the HMD user's hand and track movement and pose (e.g., position and orientation) of the hand. In some implementations, the hand can be detected and tracked using two or more cameras (e.g., stereoscopic rendering) that generate a 3D map of the physical environment. Alternatively, in some implementations, the hand can be tracked using simultaneous localization and mapping (SLAM) processes and corresponding sensors. In some implementations, the hand can be tracked using an event camera and corresponding processes. In one implementation, a 2D camera can use machine learning techniques to fit a hand model to the 2D images for detecting and tracking the hand. In some implementations, a pre-scanned geometric representation of the HMD user's hand (e.g., without reconstruction) can be used with a video stream of the physical environment to detect and track the hand in the video stream. In some implementations, motion prediction methods are used to accurately predict the hand motion occurring during the latency resulting from camera read out or data processing. In some implementations, active sensors track the HMD user's hand, for example, using a signal from a transmitter at the HMD user's hand, which is detected by a corresponding receiver at the HMD to detect and track the HMD user's hand. In some implementations, color images can be used. Alternatively, in some implementations, grayscale images can be used. Further, in some implementations, combinations of these tracking techniques are used.

In some implementations, detecting a surface of the object may involve first detecting the object (e.g., hand), and second detecting a surface of the object (e.g., palm). In some implementations, the detected surface of the hand further satisfies particular criteria (e.g., approximately flat, contiguous, prescribed color, shape). In some implementations, detecting the object involves detecting that the object is held by a body part of the HMD user.

In some implementations, detecting an object of a particular type (e.g., hand) and having a particular surface characteristic (e.g., flat palm visible) could be a trigger for displaying of the CGR virtual content based on a surface of the object. In some implementations, other triggers (e.g., hand gestures) could additionally or alternatively be used to initiate the display of the CGR virtual content at the HMD user's hand (e.g., palm facing in and circled to the right) or terminate the display of CGR virtual content at the HMD user's hand (e.g., palm facing in and circled to the left).

At block 530, the method 500 determines a virtual content location to display CGR virtual content, (e.g., augmented text, content), where the virtual content location corresponds to the location of the object (e.g., a surface of the object). In some implementations, the virtual content location is determined so that the object (e.g., hand) provides a known background (e.g., color) for CGR virtual content subsequently displayed to the HMD user. In some implementations, the virtual content location is determined so that the object (e.g., hand) provides a known spatial position for the CGR virtual content subsequently displayed to the HMD user (e.g., the HMD user knows the location of their hand).

In some implementations at block 530, determining the virtual content location may involve determining a 3D representation of the object and identifying a plane that is aligned to or in front of the object. In some implementations, determining the virtual content location may involve determining a boundary of the object in front of which the CGR virtual content will be presented.

At block 530, the method 500 may determine characteristics (e.g., color) of the virtual content to be displayed based on the object or other aspects of the physical environment (e.g., background color, ambient light, or tint (e.g., if any) of the display of the HMD). In some implementations, an optical see-through head mounted display displays the CGR environment where generated CGR virtual content is seen by the HMD user as a combination of a background color in the physical environment, a color of ambient light and the color of the CGR virtual content. Thus, virtual text may be provided in a color that is determined to have sufficient contrast for visibility (e.g., readability) when displayed at the virtual content location (e.g., at or in front of the hand) to the HMD user.

At block 540, the method 500 provides a view of the physical environment and the virtual content positioned at the virtual content location. In some implementations, the CGR environment is an optical see through AR. In some implementations, the CGR environment is video pass through AR.

Virtual content displayable at a virtual content location as described herein is intended to include any virtual objects implemented by CGR environments. In some implementations, the displayable virtual content includes information about objects in the CGR environment, received virtual content (e.g., a text message), created virtual content, selected virtual content (e.g., selected images captured by a camera), or the like. For example, the displayable virtual content can be an object or view captured by an associated camera and augmented, e.g., small text/image seen by the camera can be enlarged and overlaid on the user's hand. In some implementations, the augmented text/image virtual content is displayed at the user's hand responsive to a prescribed gesture or when the user's hand is sufficiently close (e.g., under a threshold distance) to the text/image to be augmented. For example, the augmented text/image is displayed at the user's hand in response to a gesture near the selectable text/image (e.g., raising the hand with palm facing toward the user near the small text/image causes an enlarged version of text/image to be displayed at the user's hand).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   at a head mounted device (HMD) having a processor:
      obtaining an image of a physical environment;
      detecting a location of a surface of an object based on the image, wherein the object is a portion of a body of a user or the object is held by the user;
      determining a virtual content location to display virtual content, the virtual content location corresponding to the location of the surface of the object;
      detecting a first color of the surface of the object;
      detecting an ambient light condition, of the physical environment;
      selecting a second color differing from the first color, wherein the second color is selected based on:
         a color contrasting with the first color of the surface of the object; and
         the detected ambient light condition; and
      in response to said detecting the first color of the surface of the object and said selecting the second color, providing a view of the physical environment with the virtual content positioned at the virtual content location such that the virtual content is displayed with the second color differing from the first color.

2. The method of claim 1, wherein the electronic device is an optical see-through head mounted display, and wherein the second color is further selected based on a color of the optical see-through head mounted display.

3. The method of claim 1, wherein providing the view of the physical environment and the virtual content comprises providing a computer-generated-reality (CGR) environment to the user.

4. The method of claim 1, wherein detecting the location of the surface of the object comprises detecting a hand of the user in the image, and wherein providing the view of the physical environment with the virtual content positioned at the virtual content location and within the outline of the surface of the object comprises displaying the virtual content at the virtual content location within an outline of the hand.

5. The method of claim 4, wherein the first color of the surface of the object comprises a color of the hand, and wherein the second color is further selected based on a color of a wearable display.

6. The method of claim 4, further comprising:
   increasing a size of the virtual content in accordance with a determination that the hand is moved closer to the electronic device; or
   decreasing the size of the virtual content in accordance with a determination that the hand is moved farther away from the electronic device.

7. The method of claim 4, wherein displaying the virtual content comprises initializing the virtual content display based on detecting the location of the surface of the object.

8. The method of claim 1, wherein detecting the location of the surface of the object comprises:
   detecting a hand of the user in the image;
   determining a position of the hand in the physical environment;
   identifying a plane based on the hand, wherein the plane is substantially orthogonal to a gaze direction toward the hand; and
   setting the virtual content location on the plane, wherein providing the view of the physical environment and the virtual content positioned at the virtual content location comprises displaying the virtual content at the virtual content location in front of the hand.

9. The method of claim 1, wherein the virtual content location is a portion of the surface of the object satisfying a predetermined criteria.

10. The method of claim 1, further comprising:
    detecting a first gesture as a first trigger to initiate provision of the virtual content at the virtual content location; and
    detecting a second gesture is a second trigger to terminate provision of the virtual content at the virtual content location.

11. The method of claim 1, wherein detecting the location of the surface of the object comprises tracking the surface of the object with respect to the electronic device.

12. The method of claim 11, wherein tracking the surface of the object with respect to the electronic device comprises:
    using sensors to implement simultaneous localization and mapping of the object;
    using a depth camera and fitting a preset model of the object to the detected depth; and
    estimating a shape, orientation, and position of the object using the depth camera, 2D cameras stereoscopically or monoscopically, a structured light camera, a thermal camera, or an event camera.

13. The method of claim 1, wherein the virtual content comprises text, image, or video content.

14. The method of claim 1, wherein the virtual content is selected based on the physical environment.

15. The method of claim 1, wherein the providing the view of the physical environment with the virtual content comprises displaying the virtual content with a shadow consistent with a position of a light source in the physical environment.

16. The method of claim 1, further comprising:
based on user manipulation of the virtual content, ceasing display of the virtual content at the virtual content location; and
re-displaying the virtual content at a new virtual content location corresponding to a portion of the body of the user associated with the user manipulation.

17. The method of claim 1, wherein detecting the location of the surface of the object comprises detecting a visible flat palm of a hand of the user in the image, and wherein providing the view of the physical environment with the virtual content positioned at the virtual content location and within the outline of the surface of the object comprises triggering, in response to said detecting said visible flat palm, display of the virtual content at the virtual content location.

18. The method of claim 1, wherein the second color is further selected based on a tint of a display of the HMD.

19. A head mounted device (HMD) comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining an image of a physical environment;
detecting a location of a surface of an object based on the image, wherein the object is a portion of a body of a user or the object is held by the user
determining a virtual content location to display virtual content, the virtual content location corresponding to the location of the surface of the object;
detecting a first color of the surface of the object;
detecting an ambient light condition, of the physical environment;
selecting a second color differing from the first color, wherein the second color is selected based on:
a color contrasting with the first color of the surface of the object; and
the detected ambient light condition; and
in response to said detecting the first color of the surface of the object and said selecting the second color, providing a view of the physical environment with the virtual content positioned at the virtual content location such that the virtual content is displayed with the second color differing from the first color.

20. A non-transitory computer-readable storage medium, storing program instructions computer-executable on a computer to perform operations comprising:
obtaining an image of a physical environment;
detecting a location of a surface of an object based on the image, wherein the object is a portion of a body of a user or the object is held by the user
determining a virtual content location to display virtual content, the virtual content location corresponding to the location of the surface of the object;
detecting a first color of the surface of the object;
detecting an ambient light condition, of the physical environment;
selecting a second color differing from the first color, wherein the second color is selected based on:
a color contrasting with the first color of the surface of the object; and
the detected ambient light condition; and
in response to said detecting the first color of the surface of the object and said selecting the second color, providing a view of the physical environment with the virtual content positioned at the virtual content location such that the virtual content is displayed with the second color differing from the first color.

* * * * *